United States Patent Office 2,749,668
Patented June 12, 1956

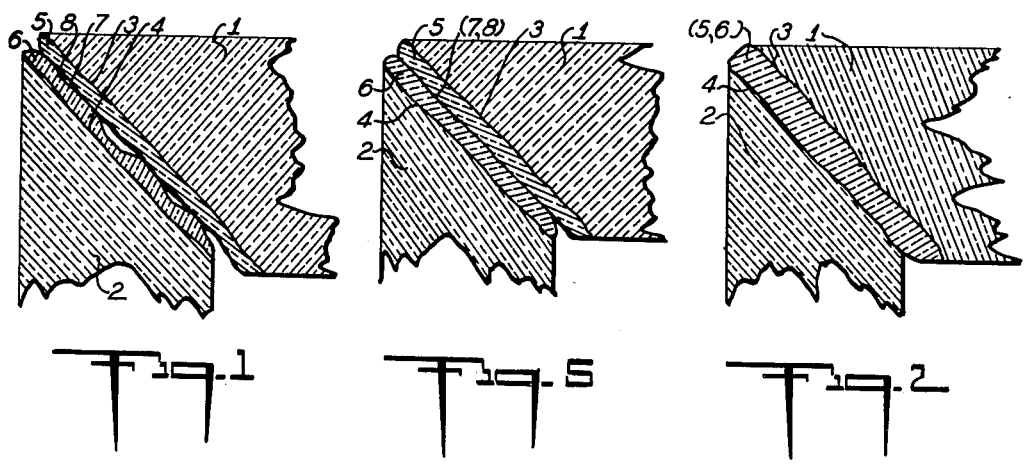
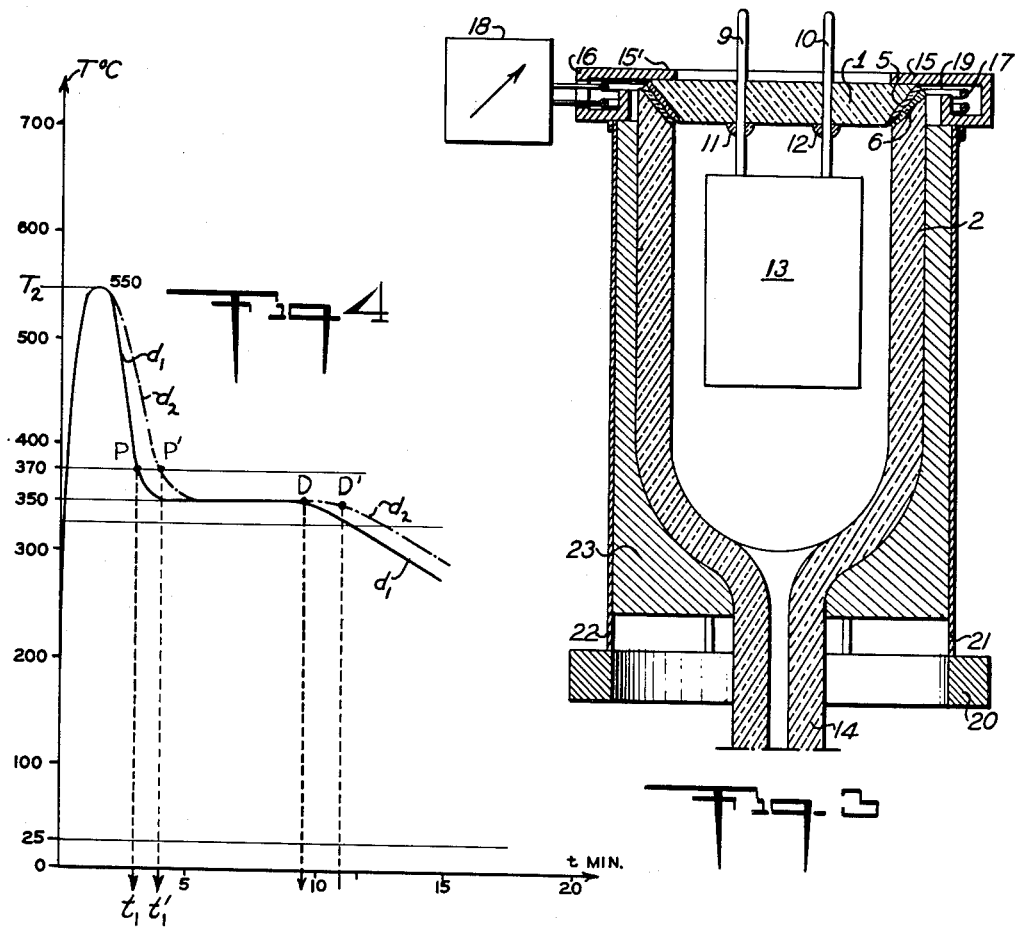

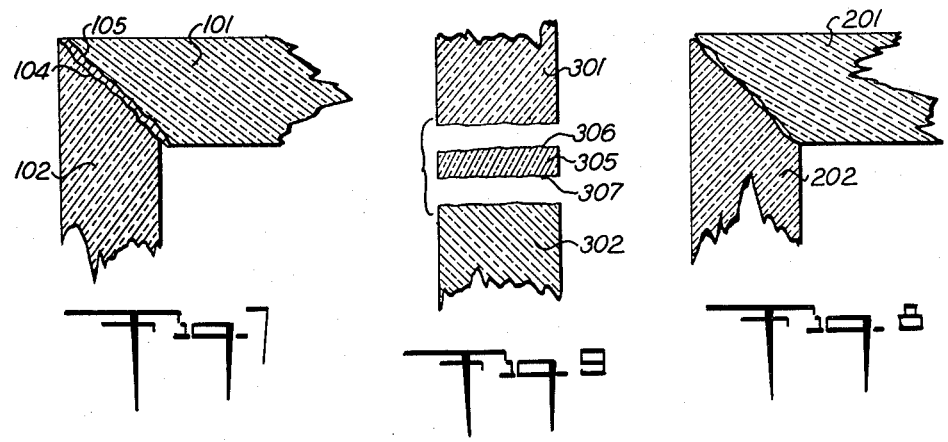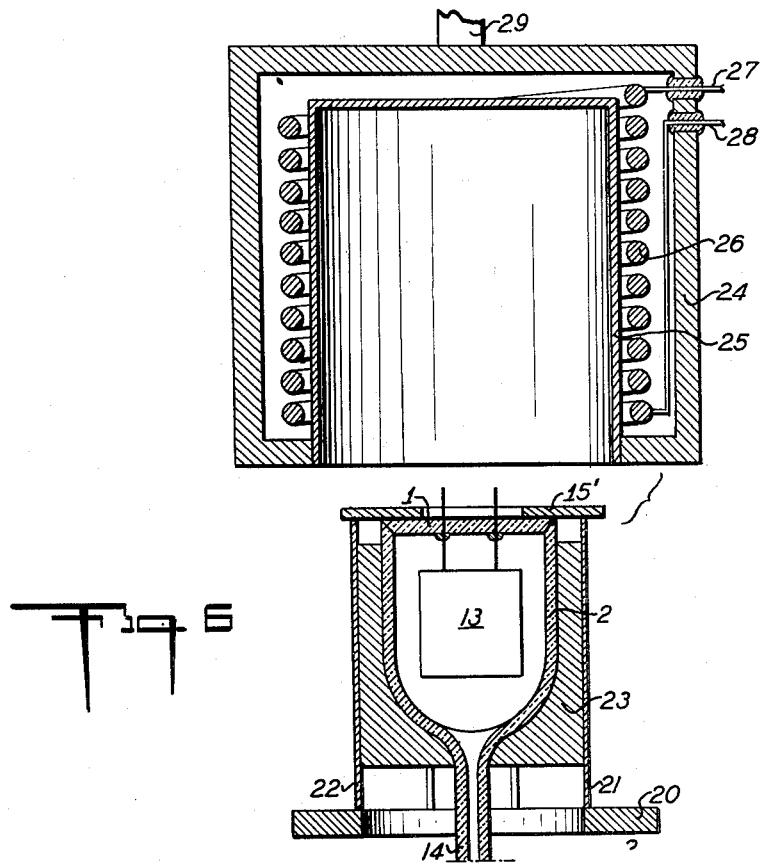

2,749,668

METHOD OF SEALING VACUUM-TIGHT ENVELOPES

Raymond Chaffotte and Pierre Nanchino, Paris, France, assignors to Compagnie Generale de Telegraphie Sans Fil, Paris, France Application August 31, 1953, Serial No. 377,654

Claims priority, application France August 30, 1952

6 Claims. (Cl. 49—78)

The present invention relates to the manufacture of vacuum-type envelopes, more particularly for use in electron-discharge tubes.

The known methods of manufacturing tubes of this type generally comprise two separate thermal operations. The first of these operations comprises sealing to each other all the parts constituting the envelope, and the second comprises de-gassing the envelope. During the second operation, the envelope is necessarily subjected to a pumping operation to a high degree of vacuum. It is important to remember that the pumping and degassing operations are applied to an envelope which has been finally sealed.

The envelope of an electron-discharge tube contains, however, a certain number of electrodes. These electrodes are often damaged during the sealing operation which includes exposure to high temperatures for an appreciable time in order to effect substantial melting of the edges of the parts to be joined. In order to seal together two glass parts, for example, their edges must be raised to a temperature substantially exceeding 1000° which is maintained for several minutes. Such temperatures are ample for raising the electrodes of the tube also to high temperatures merely by radiation effect, and the combined action of the heat and the oxygen in the air surrounding these electrodes will generally contaminate them. As a result, there is a high rate of rejects in the known methods of manufacture, in addition to which the fusion of the abutting edges of the glass parts involves deformations and collapse of the parts of the envelope which also increase the rate of rejects.

Various attempts have been made to prevent oxidation of the electrodes during the sealing operation by carrying it out, for example in a non-oxidizing atmosphere. All of the various expedients developed for this purpose have failed, however, due to complications and high cost, and none of them has been extended to mass production. One of these attempts was aimed at improving the methods of manufacture by lowering the sealing temperature. For this purpose, an intermediate sealing material was used having a lower melting point than the parts to be sealed. Such materials generally comprise enamels, which are, in effect, low melting point types of glass. Enamels are known which have a melting point in the neighborhood of 600° C. An enamel seal is obtained by positioning some enamel between the edges of the parts to be joined and by heating this enamel to its melting point. The use of enamels, however, has not substantially decreased the rate of rejects, at any rate to an extent sufficient for compensating the increased unit cost of manufacture resulting from the use of enamel.

The process according to the present invention eliminates all risk of damage to the electrodes during the sealing operation and it reduces to a negligible value the deformations which occur during that operation.

The process according to the invention allows the vaccum tight sealing of at least two parts of an evacuated envelope, at least one of said two parts having an edge made of a vitreous material, said material having a softening temperature at most equal to 600° C. and a melting point substantially higher.

The soldering process comprises the steps of assembling the parts constituting the envelope; applying to the zone of contact a thermal peak or impulse, the amplitude and duration of which are so determined that the elements of the tube located inside the envelope are unaffected for the duration of this impulse, in the case of an electronic tube, the electrodes are protected against contamination, and the vitreous material is sufficiently softened, and simultaneously impressing said parts upon each other, thereby constituting a provisional seal having sufficient vacuum tight properties to enable vacuum pumping to a high degree immediately following the thermal peak.

The envelope assembled in the foregoing manner is then subjected to a pumping operation up to a high degree of vacuum and thereafter to the de-gassing thermal treatment, the temperature range of which is lower than the maximum amplitude of the thermal peak, but sufficient for converting the provisional seal by molecular diffusion into a permanent seal.

According to a preferred embodiment of the invention, the parts to be soldered are made of glass. This process comprises the preparatory step of coating the abutting edges of at least one of the parts to be joined with a layer of a vitreous material capable of bonding with the opposed abutting edge, the softening temperature of this material being lower than that of the glass.

The sealing material may be of enamel type. Suitable enamels are known for this purpose which have a base of silica, barium oxide and lead oxide.

The layer of enamel may be applied to the edge of the part by dipping it in a suspension of very fine powdered sealing material suspended in a suitable liquid. The coated edge is then dried to drive off the suspending liquid from the suspended powder, and it is heated before heating the parts up to a temperature sufficient to enable the layer of powder enamel covering the edge of the part to be converted into a layer of vitreous enamel adhering intimately to the edge of the part.

In order more effectively to protect the electrodes against heat radiation, it is advantageous to surround the parts of the envelope with suitable protecting means whereby the action of the thermal peak may be restricted to the zone of contact of the abutting edges without extending substantially to the rest of the envelope.

The thermal peak and the de-gassing operation may be carried out by using a single heating means or by using two separate heating means.

The invention will be more readily understood from the following detailed description, reference being made to the accompanying drawings illustrating some examples of the invention.

In the accompanying drawings:

Figure 1 and 2 illustrate diagrammatically an enlarged section through part of the seal of a vacuum-tight tube in two stages of manufacture where use is made of an intermediate layer of enamel as known in the art, while Figure 5 illustrates an intermediate stage reached during the manufacture according to the present invention;

Figure 3 illustrates an axial section through an assembled tube in conjunction with a device for providing the provisional seal illustrated in Figure 5 according to the present invention;

Figure 4 is the thermal diagram characterizing the process according to the present invention;

Figure 6 is a view similar to Figure 3 of a modified form of device providing the provisional seal according to the present invention;

Figures 7, 8 and 9 illustrate enlarged views similar to Figures 1, 2 and 5 of modified forms of seals which may be obtained in accordance with the present invention.

Consideration will be given first to known conventional enamel sealing methods which will then be compared with the present invention.

As seen in Figure 1, the abutting edges of two glass parts 1 and 2 to be joined by a known enamel seal are shaped to have mating conical surfaces 3 and 4. These edges are covered with two layers of enamel 5 and 6. The two layers of enamel 5 and 6 are brought together with their surfaces 7 and 8 in contacting relationship. The contacting surfaces 7 and 8 are in a rough state and do not provide a vacuum-tight seal nor even an air-tight seal. It is known to heat these contacting edges until the enamel reaches its melting point. The two layers of enamel are fused together to form a single layer (5, 6) as seen in Figure 2. There is thus provided a permanent vacuum-tight seal having the disadvantages referred to above. Assuming that the enamel used in the known methods has a melting point of 600° C., the heating operation for these edges up to 600°, the maintenance of this temperature to effect fusion at 600° and cooling of the abutting edges before pumping to a high degree of vacuum will involve at least twenty minutes. Since the closed envelope is full of air, the electrodes in the neighborhood of the sealing zone must necessarily be oxidized to a point where the rate of rejects will be very important.

After this sealing operation, the closed envelope is subjected during an entirely separate operation, to pumping up to a high degree of vacuum and it is heated to a de-gassing temperature below the lowest level of deformation of the enamel. For the enamel indicated above by way of example, the lowest level or threshold of deformation is in the neighborhood of 370° C. During the de-gassing operation, since the closed envelope is subjected to a high degree of vacuum, the enamel must remain in a solid state, failing which the gases occluded in all materials of an enamel type would be expelled from the material in the form of bubbles and would weaken the seal.

It has therefore been shown that the manufacture, according to the known methods comprises two separate and independent thermal operations, namely the sealing operation, at a temperature of 600°, involving about twenty minutes, and the de-gassing operation at a temperature below 380°, for example 350°, the duration of which will depend on the size of the tube. Between these two operations, the closed envelope is subjected to high vacuum pumping with the seals in the condition illustrated in Figure 2.

The process according to the present invention may also be applied for manufacturing a tube or envelope of the same type as has been described in connection with the prior art, use being made of the same type of enamel. The parts of the tube are prepared and enameled in the same manner as has been described with reference to Figure 1. The thickness of the layer of enamel may vary within a range of 0.1 to 0.5 millimeter depending upon the surface which has been enameled, the profile of the enameled surface and the material of which it consists.

As will be seen in Figure 3, the edges of the glass base 1 and of the glass bulb 2 of a tube have been enameled in the manner described above. As shown in Figure 3, the parts 1 and 2 have simply been assembled in contacting relationship of the enameled layers 5 and 6 similarly to Figure 1. The leads 9 and 10 are sealed to the base by glass beads 11 and 12 and electrodes are connected to these leads as indicated diagrammatically by block 13. The other end of part 2 is provided with an exhaust appendix 14 extending therefrom.

The assembled tube is arranged vertically with the base 1 at the upper end and the appendix 14 is connected to a high-power vacuum pump of conventional construction not shown in the drawing.

The assembled tube is then provided with a device comprising a ring member 15 the inwardly extending flange 15' of which rests upon the peripheral edge of the base 1. The ring member 15 comprises a toroidal portion 16 inside of which is positioned an electric heating element or resistance 17. The resistance 17 may be raised to a desired temperature by supplying current thereto from a source 18, the quantity of current supplied being adjustable. The toroidal portion 16 comprises a circular slot 19 through which the heat dissipated by the resistance 17 may radiate inwardly directly toward the contacting zone of the enameled layers 5 and 6. A ring-shaped weight 20 is suspended by threads or wires 21 and 22 from the ring member 15, whereby the base is applied against the bulb 2 with a desired pressure. A cylindrical sleeve 23 of glass fibre, or other suitable insulating material, is positioned to surround the bulb 2 in order to protect the electrodes 13 against direct radiation of heat from the resistance 17 and the toroidal portion 16 when these are raised to an elevated temperature.

Assuming, for the sake of example, that the base 1 and bulb 2 are of ordinary clear glass having a co-efficient of expansion of approximately $95.10^{-7}$, the enamel of the layers 5 and 6 may comprise a major portion of lead oxide, of barium oxide and a small portion of silica and soda. An enamel of this composition will have a co-efficient of expansion in the neighborhood of $100.10^{-7}$. It is known, in fact, that an enamel having these constituent parts may have a co-efficient of expansion varying from $80.10^{-7}$ to $110.10^{-7}$ depending upon the exact proportions of the various components. An enamel having a co-efficient of expansion in the neighborhood of $100.10^{-7}$ will have a deformation temperature of approximately 370° C. and a melting point of the order of 600° C.

The process of manufacture according to the present invention comprises supplying to the resistance 17 of Figure 3 a very high or intense heating current, in order that the layers of enamel 5 and 6 may be raised very rapidly in a matter of one to three minutes to a temperature which substantially exceeds their temperature of deformation. In other words, when proceeding with the enamel having a composition referred to in the preceding paragraph, the temperature to which the resistance is raised rapidly must be substantially in excess of 370° C. in order to soften the enamel. Immediately after this rise of temperature, the supply of current to the resistance 17 is interrupted in order to cause the temperature to drop below 370° C. This is obtained with relative ease if the material of the ring member 15 has only a slight calorific inertia. The general appearance of the heat cycle will be seen from curve $d_1$ of the curve representative of the first part of Figure 4 in the portion of time comprised between $t=0$ and $t=P$. It will be seen from this diagram that the temperature of the enamel increases in about 1.5 minutes from 25° C. to 550° C. and that it falls back to 370° C. between $t=1.5$ minutes and $t=3$ minutes. The enamel has not been heated up to its melting point, but only to a degree of softening which is sufficient for the weight of the ring-shaped member 20 of Figure 3 to render plastic the enamel layers 5 and 6 and flatten them out slightly by impressing them intimately upon each other.

At the termination of the cycle which has just been described, the condition of the abutting edges of the parts is as shown in Figure 5, from which it will be seen that the layers of enamel 5 and 6 are very slightly deformed as a result of which the undulated surfaces 7 and 8 clearly seen in Figure 1 have been flattened out and are intimately mated to constitute a vacuum-tight contact 7, 8 indicated in Figure 5. This contact is completely different from the final seal obtained in the conventional manner as described in connection with Figure 2. Although the contact 7, 8 may comprise the zone of close adhesion between the two surfaces 7 and 8, it does not have sufficient mechanical solidity to permit the use of the tube in this condition. This may be readily ascertained with a tube as shown in Figure 3 which has been entirely cooled after completing the heat treatment as described above. By applying torsion to the base 1 relative to the bulb 2, it is easy to separate these parts.

When the two parts of the tube are in the position described in connection with Figure 5, the tube is subjected to a high degree of vacuum at the point P of the curve $d_1$ of Figure 4. Thereafter, the electrodes are no longer subjected to the danger of oxidation, and since the enamel is kept below its softening temperature, there is no longer any risk of destroying the contact either by pressure of the outside atmosphere or by the escape of bubbles of occluded gas. Starting from the point P' of Figure 4, which is close to the point P, the evacuated tube is passed through a de-gassing oven, the temperature of which is maintained below the temperature of deformation of the enamel but above the temperature corresponding to the transformation or conversion point of this material. Taking the enamel described above, the oven is kept at a temperature of approximately 330° C. After 8 to 10 minutes of de-gassing, corresponding to the horizontal portion P to D of Figure 4, and after cooling to approximately 250° C., the tube is removed from the oven.

By this process, it is possible to use a rotary vacuum tray and an arcuate or circular degassing tunnel associated therewith, both of which are well known in the art. Where use is made of a rotary vacuum tray, the thermal peak may be applied by the ring member 15 at the entrance to the tunnel oven, and the ring member 15 may be removed either immediately before the tube enters the tunnel or at the exit therefrom. The latter solution may be preferable because the formation of a final seal, where the tube passes from the condition shown in Figure 2, is somewhat enhanced by the pressure which is applied by the ring member to the seal, although such pressure could also be provided by screws or spring means or in any other appropriate manner.

During this last series of steps, apart from the actual de-gassing, a final seal has been obtained because the contact 7, 8 of Figure 5 has been converted into a final seal at the temperature maintained in the oven. At that temperature, the intimate contact 7, 8 of Figure 2 is progressively converted into a seal, and at the end of the de-gassing step the seal appears as the single homogeneous enamel layer 5, 6 shown in Figure 2.

This conversion is believed to be based upon the phenomenon of molecular diffusion or solid sealing of the two surfaces between which the perfect contact has been established.

Experiments have shown that the use of enamel prescribes certain limits for the heating conditions which must be maintained in order to yield a good industrial result. The temperature at which the parts are impressed upon each other must be selected between the spreading or wetting temperature of the enamel and the softening point of the enamel. The spreading or wetting temperature is defined as the temperature at which the enamel is capable of flowing under its own weight, thereby to wet the surface upon which it is supported. By maintaining the temperature of impression within the limits defined above, it is possible to obtain a perfect impression of the layers of enamel upon each other without excessive flattening of their cross-section.

The sealing temperature, represented by the horizontal portion P—D of Figure 4, must be kept at an intermediate value between the temperature at which the enamel would tend to form bubbles when subjected to vacuum and the annealing temperature corresponding generally to the transformation level of the enamel. This condition is of great importance and quite decisive as to the quality of the seal. As pointed out above, all materials of a vitreous nature contain a substantial quantity of occluded gases which tend to be liberated in the presence of vacuum and to form minute bubbles at the surface of the enamel, thereby rendering the seal spongy or porous, and having a detrimental effect on the mechanical and vacuum-tight properties of the seal. In order to prevent the occurrence of this phenomenon, it is necessary to lower the temperature at the zone of the seal as soon as the vacuum is established inside the tube, the temperature being lowered to at least a level at which the co-efficient of viscosity is capable of preventing this phenomenon. The viscosity of the enamel must be increased to a point at which the mass of enamel is sufficiently compact and dense to resist the liberation of the occluded gases.

The lower limit of this thermal phase is determined by the temperature of the enamel below which it ceases to diffuse into the surfaces in intimate contact therewith under the application of reasonable mechanical pressure.

One of the enamels used had a co-efficient of expansion of $95.10^{-6}$. It had a viscosity of $10^{13}$ poises at the annealing point and $10^{7.65}$ at the softening point. The viscosity fell to $10^6$ at a temperature at which gases began to be liberated in the vacuum.

The thickness of the layer of enamel at the end of the enameling step could vary from 0.1 to 0.5 millimeter. Enameling was carried out in the conventional manner by dipping in an enamel base, drying and firing.

The enamel was positioned on the edges of a glass bulb of clear soda glass having an annealing point of 510° to 520° C. and a co-efficient of expansion of approximately $92.10^{-6}$. In this example, the enamel was applied only to the bulb which was then sealed to a base of soda glass to which no enamel had been applied. The pressure applied for the impression step was of the order of 0.2 to 0.5 kg./cm.² The pressure may be varied according to the condition of the surfaces to be sealed, the shape and cross-section of the contacting areas and the temperature of operation. The pressure may be increased to 1 kg./cm.² by reducing the temperature of the enamel peak and by correctly positioning an abutment for preventing excessive deformation of the layer of enamel.

During the sealing operation, however, the pressure is determined by the total cross-section of the tube subjected to barometric pressure and by the cross-section of the seal supporting this pressure. Thus the enamel may be subjected to a pressure varying from 2 to 10 kg./cm.²

A high degree of vacuum of the order of $10^{-4}$ millimeters of mercury, which is sufficient for de-gassing the tube, can be obtained rapidly in a matter of seconds by appropriately applying the vacuum pump to the exhaust appendix of the tube at the point P of Figure 4.

As described in Figure 6, the two operations of thermal peak and degassing can be carried out with a single heating apparatus. In the embodiment of Figure 6, a tube similar to the one shown in Figure 3 has been assembled and weighted by a flange member 15' substantially similar to the top portion of the ring member 15 of Figure 3, and by a ring-shaped weight 20 suspended therefrom by the same threads 21 and 22. The assembled tube is positioned beneath an oven indicated in the upper part of Figure 6 and comprising an outer casing 24 and an inner lining 25 defining a downwardly open cylindrical cavity dimensioned to accommodate relatively snugly the assembled tube together with the flange member 15' shown at the lower part of Figure 6. The oven further comprises an electrical heating resistance or coil 26 positioned between the outer casing 24 and the inner sheath 25 having supply terminals 27 and 28. The oven is connected by conventional means 29 to raising and lowering apparatus not shown.

The arrangement of Figure 6 operates as follows. The oven, in the position shown in Figure 6, is raised to a temperature $T_1$ by supplying a heating current $i_1$ to the coil 26 thereof.

Then the oven is lowered so as to cover substantially only the zone of contact of the base 1 and the bulb 2. At the same time, the current flowing through the coil 26 is reduced from the value $i_1$ to a lower value $i_2$. The temperature inside the oven is reduced slowly, firstly because it yields some heat to the abutted edges of the parts 1 and 2, and secondly, because the current is lowered from $i_1$ to $i_2$.

However, the temperature of the contact zone increases rapidly to a maximum temperature $T_2$, which is at the same time the temperature of the oven.

Then the common temperature of the oven and of the contact zone decreases to a value corresponding to the ordinate of the point P′ of Figure 4. At this moment, the oven is lowered until the tube is completely covered and the vacuum pump is applied to the tube.

The current $i_2$ is chosen to maintain the oven and the tube at an equilibrium temperature suitable for the degassing. It will be seen from Figure 4 that the pattern of the curve $d_2$ deviates from the pattern of the curve $d_1$ only in respect of falling temperatures, and this is due only to the fact that the calorific inertia in an oven of a substantial size must necessarily be greater than that of a small ring member.

Reference has been made herein to enameling both the edges to be joined, but the invention is in no way limited to this feature. In certain cases it is possible to enamel only one of the abutting edges, for example as shown in Figure 7, where a glass part 102 may be sealed to an enamelled ceramic part 101 which can be used without special enamel. In this embodiment, the thermal peak is capable of impressing the enameled layer 105 which is provided as a coating on the edge of the ceramic part 101 upon the surface 104 of the glass part 102. The temporary seal will have the same characteristic features as in Figure 2 and de-gassing will be carried out at the diffusion temperature of the enamel into the glass, thereby providing a final seal.

It is also possible, as shown in Figure 8, not to enamel either of the parts but to apply the process directly to the formation of a seal between the two edges of glass parts 201 and 202, the edges of which are in a rough state and can be brought into intimate contact with each other by impression. This modified process can be carried out if the two parts are of relatively soft glass provided the maximum temperature of the thermal peak is not too high.

A still further embodiment is shown in Figure 9, this embodiment being directly derived from the preceding embodiments. In this case two parts 301 and 302, which may or may not be enameled as desired, are provided with an intermediate enamel or soft glass part 305, the surfaces 306 and 307 of which will be impressed upon the abutting edges of the parts 301 and 302 when the thermal peak is applied. The enamel used in this embodiment may be a lead borate enamel having for example the following composition:

0.5% of $SiO_2$
76.35% of $PbO_2$
22% of $B_2O_3$
1.15% of $Na_2O$

Enamels of this composition may be used with glass having a co-efficient of expansion varying from 80 to $110.10^{-7}$.

Careful attention must be given to the co-efficient of expansion in selecting the material of the glass parts and the appropriate enamel. When an enamel is selected which has a low melting point, there is a far greater tolerance of discrepancy between the co-efficients of expansion than in conventional fusion sealing. Furthermore, it may be advantageous to carry out the process on surfaces which have the smooth appearance obtained from firing such as will result from the spreading or wetting of the enamel. Such surfaces do not have sharp protuberances or asperities and they are more readily impressed upon each other, but this condition does not restrict the present invention.

The shape or cross-section of the contacting surfaces of the abutting edges to be joined may be selected to conform to the type of joint used. The surfaces may be of conical shape as shown in Figure 1 or of plane shape as shown in Figure 9. In some cases it may be advantageous to use complementary curved surfaces.

Generally speaking, the process improves the manufacture of any tube intended for radio electric purposes and of any envelope capable of being subjected to thermal treatment comparable to de-gassing. It is also applicable to the manufacture of seals between parts of different material construction such as glass, ceramics and metals.

What is claimed is:

1. Method of producing a vacuum tight seal between the parts of an evacuated envelope, at least one of said parts having an abutting edge made of a vitreous material, which has a melting point at most equal to the respective melting points of said parts, said method comprising the steps of: assembling the parts of the envelope with the edges to be sealed in contacting relationship with each other; simultaneously subjecting said edges to a thermal impulse at a peak temperature comprised between the melting point and the softening temperature of said vitreous material, for a time interval sufficient to render said vitreous material soft, and applying pressure to said edges in a direction to press them together and constitute a temporary vacuum tight seal; and thereafter lowering said temperature to a value suitable for sealing said edges permanently by surface diffusion of the molecules thereof and for avoiding the deformation of said parts.

2. Method of producing a vacuum tight seal between the parts of an evacuated envelope of an electron discharge tube, at least one of said parts having an abutting edge made of a vitreous material, which has a melting point at most equal to the respective melting points of said parts, said method comprising the steps of: assembling the parts of the envelope with the edges thereof to be sealed in contacting relationship with each other; simultaneously subjecting said edges to a thermal impulse at a peak temperature comprised between the melting point and the softening temperature of said vitreous material, for a time interval sufficient to render said vitreous material soft, and applying pressure to said edges in a direction to press them together, thereby to constitute a temporary vacuum tight seal; and thereafter lowering said temperature to a value suitable for sealing said edges permanently by surface diffusion of the molecules thereof and for avoiding the deformation of said parts to enable pumping and degassing said vacuum tight envelope.

3. Method of producing a vacuum tight seal between the parts of an evacuated envelope of an electron discharge tube, said parts being made of glass, at least one of said parts having an abutting edge coated with a layer of vitreous enamel which has a melting point at most equal to the respective melting points of said parts, said method comprising the steps of: assembling the parts of the envelope with the edges thereof to be sealed in contacting relationship with each other; simultaneously subjecting said edges to a thermal impulse at a peak temperature comprised between the melting point and the softening temperature of said vitreous material, for a time interval sufficient to render said vitreous material soft, and applying pressure to said edges in a direction to press them together thereby to impress said edges upon each other, and constitute a temporary vacuum tight seal; thereafter lowering said temperature to a value suitable for sealing said edges permanently by surface diffusion of the molecules thereof and for avoiding the deformation of said parts; and vacuum pumping and degassing said vacuum tight envelope.

4. Method according to claim 3, which comprises radiating exclusively the heat inwardly toward said edges from the surrounding area, and controlling the heat to provide said thermal impulse.

5. Method according to claim 4 which includes protecting all the envelope except said edges against heat radiation.

6. Method according to claim 3 which comprises positioning the tube with its base directed upwards and resting on its bulb; positioning a weighted element on said base; surrounding said bulb with a heat-insulating screen; heating the zone of contact of said base and bulb, up to said maximum temperature; and thereafter maintaining the whole tube at a temperature at which said base and bulb will bond by surface diffusion.

References Cited in the file of this patent

UNITED STATES PATENTS

| | | |
|---|---|---|
| Re. 23,492 | Despois | May 20, 1952 |
| 1,206,177 | Twyman et al. | Nov. 28, 1916 |
| 1,796,401 | Sample | Mar. 17, 1931 |
| 2,125,316 | Ronci | Aug. 2, 1938 |
| 2,248,644 | Reger et al. | July 8, 1941 |
| 2,268,670 | Ronci | Jan. 6, 1942 |
| 2,464,990 | Plagge | Mar. 22, 1949 |
| 2,499,854 | Ellefson | Mar. 7, 1950 |

FOREIGN PATENTS

| | | |
|---|---|---|
| 391,245 | Germany | Mar. 1, 1924 |